(12) United States Patent
Seljan

(10) Patent No.: US 9,381,773 B2
(45) Date of Patent: Jul. 5, 2016

(54) TIRE FOR CENTER PIVOT IRRIGATION

(71) Applicant: Scott P. Seljan, Lake Mills, WI (US)

(72) Inventor: Scott P. Seljan, Lake Mills, WI (US)

(73) Assignee: Mach II Tire Company LLC, Lake Mills, WI (US)

( * ) Notice: Subject to any disclaimer, the term of this patent is extended or adjusted under 35 U.S.C. 154(b) by 342 days.

(21) Appl. No.: 13/750,998

(22) Filed: Jan. 25, 2013

(65) Prior Publication Data

US 2013/0192734 A1    Aug. 1, 2013

Related U.S. Application Data

(60) Provisional application No. 61/591,138, filed on Jan. 26, 2012.

(51) Int. Cl.
*B60C 7/08*    (2006.01)

(52) U.S. Cl.
CPC ............ *B60C 7/08* (2013.01); *Y10T 152/10342* (2015.01)

(58) Field of Classification Search
CPC ............ B60C 7/08; B60C 7/12; B60C 7/125; B60C 11/0311; B60B 15/02; B60B 15/023; B60B 15/025; B60B 15/026; Y10T 152/10342
USPC ................. 152/246, 300, 306, 307, 308, 309, 152/209.12; 301/13, 43; D12/544
See application file for complete search history.

(56) References Cited

U.S. PATENT DOCUMENTS

| 887,341 | A | | 5/1908 | McDermott | |
|---|---|---|---|---|---|
| 1,392,866 | A | * | 10/1921 | Clifton | ............................ 301/43 |
| 2,331,581 | A | * | 10/1943 | Thompson | .................... 152/308 |
| 2,343,251 | A | | 3/1944 | Beard | |
| 3,435,873 | A | | 4/1969 | Weier | |
| 4,791,971 | A | | 12/1988 | Shinn | |
| 4,929,032 | A | | 5/1990 | Isaacson | |
| 5,016,696 | A | | 5/1991 | Bonko et al. | |
| 5,810,452 | A | | 9/1998 | Hawthorne et al. | |
| 5,868,036 | A | | 2/1999 | Salzman | |
| 7,762,296 | B2 | | 7/2010 | Ganz et al. | |
| 8,678,054 | B2 | * | 3/2014 | MacPherson | .................. 152/306 |
| 2004/0118497 | A1 | * | 6/2004 | Bonko et al. | ............. 152/209.12 |
| 2006/0162833 | A1 | * | 7/2006 | Bodony | ........................ 152/300 |
| 2009/0084478 | A1 | * | 4/2009 | Wallet et al. | ............. 152/209.13 |
| 2010/0243118 | A1 | | 9/2010 | Bonko et al. | |
| 2012/0241531 | A1 | | 9/2012 | Werner | |

FOREIGN PATENT DOCUMENTS

| EP | 0795427 A1 | 9/1997 |
|---|---|---|
| GB | 2193933 A | 2/1988 |

* cited by examiner

*Primary Examiner* — Kip T Kotter
(74) *Attorney, Agent, or Firm* — Joseph T. Leone, Esq.; DeWitt Ross & Stevens S.C.

(57) ABSTRACT

An exemplary embodiment relates to a non-pneumatic tire for a center pivot irrigation system comprising two arcuate half-tire segments, the segments having two sidewalls connected by an outer circumferential wall and an inner circumferential wall; a plurality of transverse traction cleats circumferentially spaced on the outer circumferential wall extending between the side walls, the cleats having a rounded tip; a pair of connecting cleats at the ends of the half-tire segments having a plurality of apertures adapted for use in connecting the two arcuate half-tire segments; and a plurality of connectors adapted for insertion into the apertures wherein the cleats are tapered in width having a ratio of the center width of the cleat to the edge width of the cleat of at least about 1.25:1.

19 Claims, 6 Drawing Sheets

TIRE FOR CENTER PIVOT IRRIGATION

NON-PNEUMATIC PRIORITY

This application claims priority to U.S. Provisional Application 61/591,138 filed on Jan. 26, 2012, which is incorporated herein by reference in its entirety.

BACKGROUND

1. Field of the Invention

The present disclosure relates to tires. More particularly, it relates to a non-pneumatic rotationally molded tire for center pivot irrigations systems.

2. Related Art

In center pivot irrigation systems, water from a centrally located source (e.g., a well) is directed along a long boom pipe to the field. The boom pivots around the center point on spaced apart towers, which support the boom. The towers are generally supported by large pneumatic rubber tires similar to conventional tractor tires. The weight supported by each tower is substantial causing the tires to sink deeply into the ground. As the tires roll across muddy soil, the tires tend to push mud to the sides and front of the tire. The accumulated mud pushed to the front of the tire can eventually build up to the point that the tire can no longer advance. This essentially shuts down irrigation until the tire can be pulled out of the rut. Rubber tires are also subject to damage or wear causing a flat tire, which also shuts down the system until the flat tire is repaired or replaced.

Rotational molding is a method of manufacture for primarily hollow or partial shell shaped plastic objects. Rotational molding (also known as "rotomolding") is typically used to produce products that are too large or complicated to be produced by other molding techniques, such as thermoforming or injection molding. Some products commonly formed by rotational molding include garbage can, fuel tanks, storage tanks, casks, and toys.

Rotational molding generally utilizes a shell mold having a cavity bounded on five sides by the mold. The sixth side of the cavity is formed by a cover attached to one or more of the adjacent sides. There are typically four steps, or stages, in a rotational molding process: loading, molding (or curing), cooling, and unloading.

When the cover to the mold is open, a powdered plastic resin, which is typically colored, is placed into the mold cavity. The cover is then sealed and the mold is placed in a heated environment in which it is rotated about two axes. The heat causes the plastic to melt against the heated inside surface of the mold. The mold continues to rotate during heating, and the plastic gradually becomes distributed evenly on the mold walls through gravitational force. While continuing to rotate, the mold is moved out of the oven to a cooling chamber, where the mold and the plastic are cooled to the point that the molded object will retain its shape. During cooling, the molded object typically shrinks away from the mold. Once the part is sufficiently cooled, it is removed from the mold and trimmed and cut to form the final part or product.

Outline of Basic & Other Advantageous Features

It would be desirable to provide a center pivot irrigation tire or the like of a type disclosed in the present application that includes any one or more of these or other advantageous features:

A tire with improved traction over conventional rubber tires;
A tire that is not inflated and subject to flats;
A tire that resists becoming bogged down in the ground;
A tire that travels over the ground more efficiently (e.g., improved floatation) reducing demands and stress on drive train components;
A tire that is chemical, fertilizer, pesticide, and ultra-violet (UV) resistant;
A tire that reduces the strain on drive train components compared to conventional rubber tires;
A tire that is comparable or less expensive than conventional rubber tires;
A tire that with large perpendicular radii for increased flexibility and strength for a longer product lifespan;
A tire that exceeds industry standards for center pivot irrigation tires;
A tire that is easily installed with minimal tools; and
A tire that is lightweight and easy to handle.

These and other features and advantages of various embodiments of systems and methods according to this invention are described in, or are apparent from, the following detailed description of various exemplary embodiments of various devices, structures, and/or methods according to the present disclosure.

SUMMARY

An exemplary embodiment relates to a non-pneumatic tire for a center pivot irrigation system comprising two arcuate half-tire segments, the segments having two sidewalls connected by an outer circumferential wall and an inner circumferential wall; a plurality of transverse traction cleats circumferentially spaced on the outer circumferential wall extending between the side walls, the cleats having a rounded tip; a pair of connecting cleats at the ends of the half-tire segments having a plurality of apertures adapted for use in connecting the two arcuate half-tire segments; and a plurality of connectors adapted for insertion into the apertures wherein the cleats are tapered in width having a ratio of the center width of the cleat to the edge width of the cleat of at least about 1.25:1.

Another exemplary embodiment relates to a method of manufacturing a tire for a center pivot irrigation system comprising providing a mold for a half-tire, the half-tire comprising an arcuate half-tire segment having two sidewalls connected by an outer circumferential wall and an inner circumferential wall; a plurality of transverse traction cleats circumferentially spaced on the outer circumferential wall extending between the side walls, the cleats having a rounded tip; a pair of connecting cleats at the ends of the half-tire segments having a plurality of apertures adapted for use in connecting the two arcuate half-tire segments; and a plurality of connectors adapted for insertion into the apertures wherein the cleats are tapered in width having a lesser width at the edge of the tire that an the center of the tire; placing an appropriate amount of plastic in the mold; closing the mold; heating the mold while rotating the mold until the plastic is fully melted; cooling the mold while rotating the mold until the plastic has solidified; and removing the half-tire segment from the mold; wherein the half-tire segment is adapted for coupling with a second half-tire segment to form a tire.

BRIEF DESCRIPTION OF THE DRAWINGS

Various exemplary embodiments of the systems and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION OF THE EXEMPLARY EMBODIMENTS

While the invention will be described in connection with the preferred embodiment, it will be understood that it is not intended to limit the invention to this embodiment. On the contrary, it is intended to cover all alternatives, modifications, and equivalents as may be included within the spirit and scope of the invention.

The present disclosure relates to a non-pneumatic rotationally molded two-piece tire for center pivot irrigation systems. In various exemplary embodiments, the disclosed non-pneumatic tire 100 comprises two substantially semicircular pieces that are securely connected together to form a tire.

Figure 1:
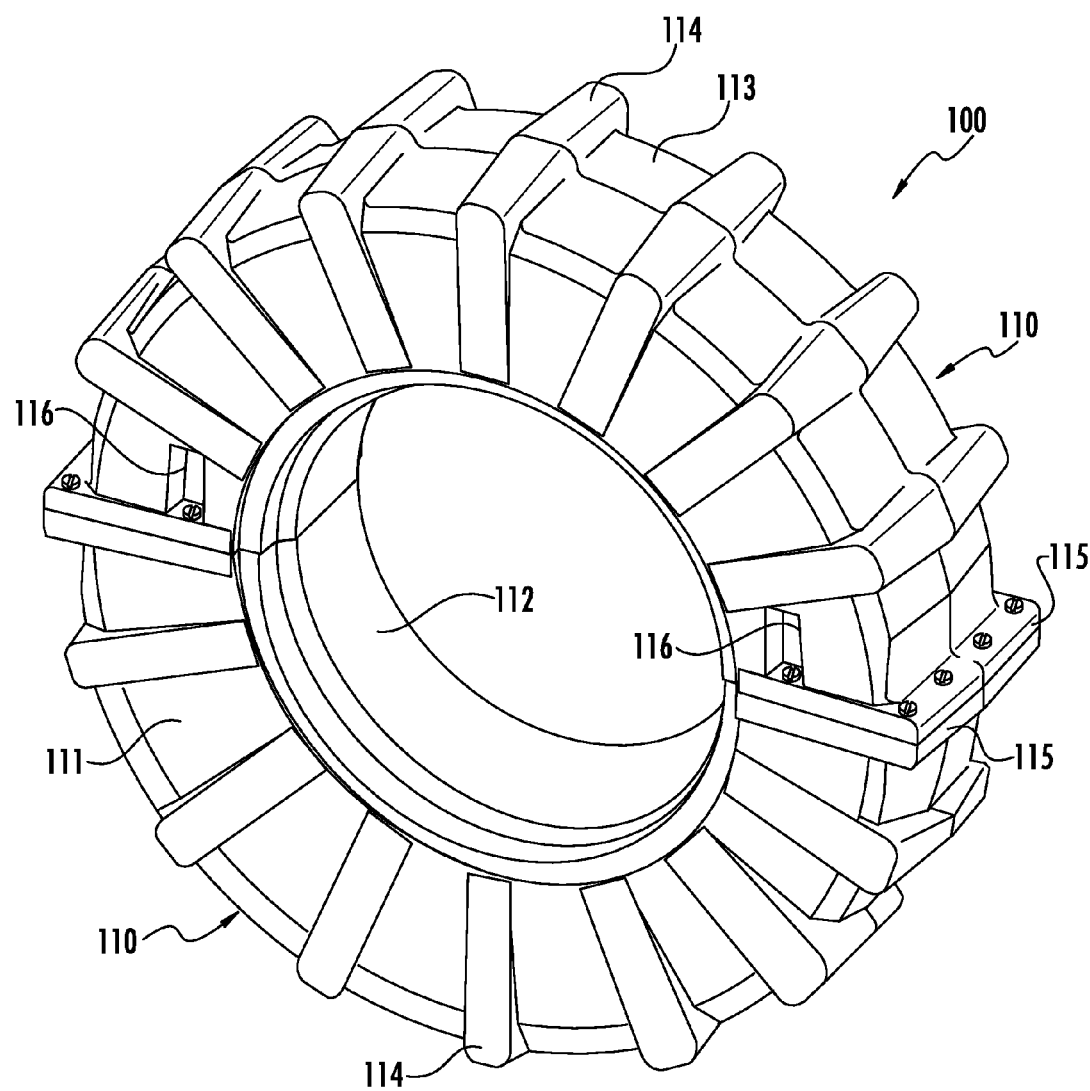
FIG. 1 is a perspective view of an exemplary embodiment of a tire for a center pivot irrigation system according to the present disclosure.
Figure 2:
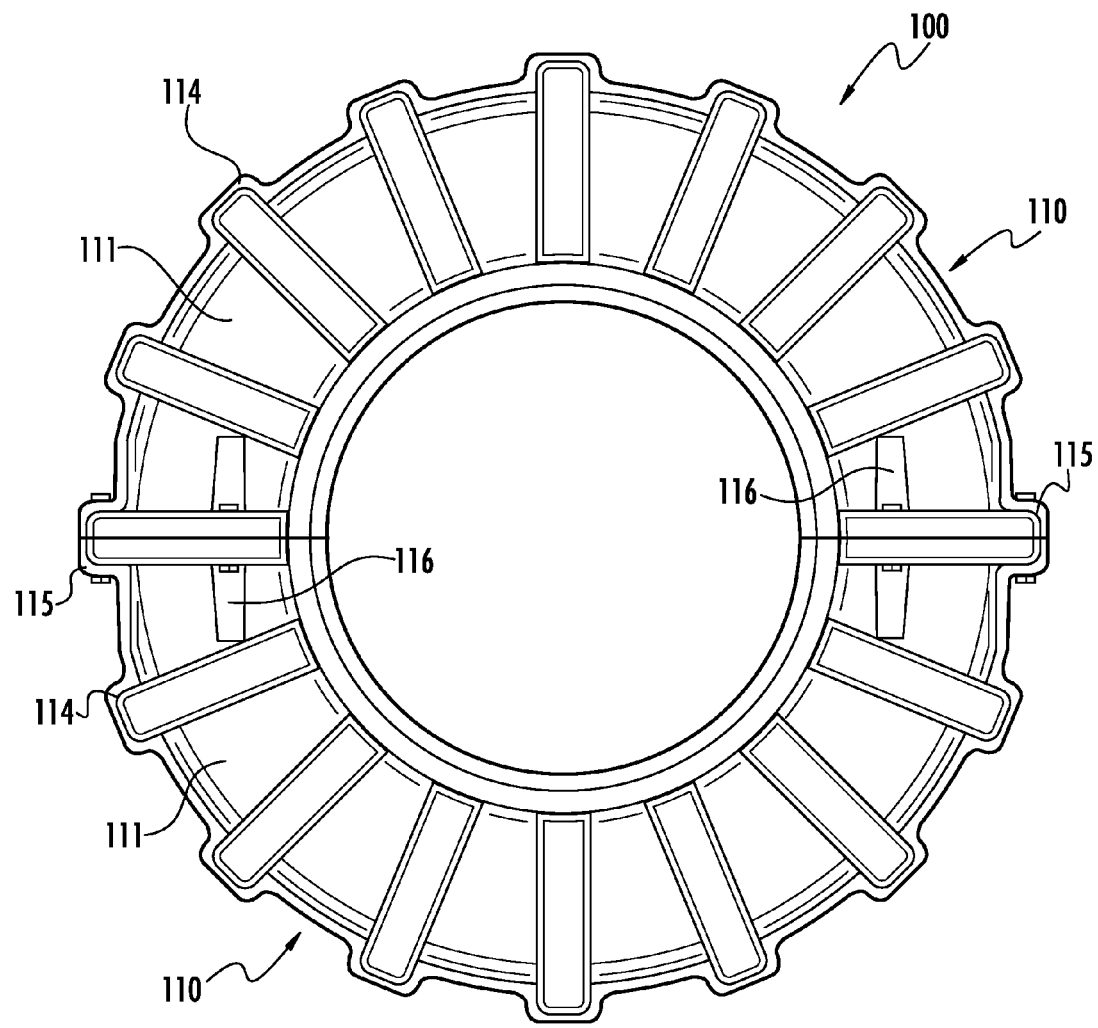
FIG. 2 is a side view of the tire of FIG. 1.

In various exemplary embodiments, as shown in FIG. 1, the disclosed non-pneumatic tire 100 comprises two halves 110. As illustrated in the exemplary embodiment of FIGS. 2-4, each half-tire 110 comprises a substantially semi-circular hollow piece defined by two sidewalls 111, an inner circumferential wall 112, and an outer circumferential wall 113. In various exemplary embodiments, each half-tire is molded as a single piece. In various exemplary embodiments, both pieces may be formed with the same mold or tool.

In various exemplary embodiments, each half-tire 110 further comprises a plurality of transverse traction cleats 114 spaced approximately evenly on the outer circumferential walls 113 and sidewalls 111. In various exemplary embodiments, as shown in FIGS. 1-4, each half-tire 110 comprises seven full cleats 114 spaced between two half-cleats 115. When two half-tires 110 are coupled together, as illustrated by FIG. 1, the four half-cleats 115 form two full cleats and the full tire 110 has a total of sixteen cleats.

In various exemplary embodiments, along the outer wall 113 the cleats 114 protrude about 1.5 inches from the tire. At the center, the cleat 114 is approximately three inches wide and tapers down to about two inches at the edges and down the sidewalls 111. In various exemplary embodiments, the ratio of the cleat width at the center to the cleat width at the edge is about 1.5. In various other exemplary embodiments, the ratio may vary between about 1.33 and about 1.75. In various additional exemplary embodiments, the ratio may vary between about 1.25 and about 2.0.

In various exemplary embodiments, the cleats 114 transition to the outer circumferential wall 113 with ½ inch radii. The tapered cleat allows the tire cleats to move soil less aggressively reducing the rate or extent to which the tire creates a trench or rut during continuous and repetitive operation, which allows longer use of the system before the ruts must be refilled.

Figure 3:
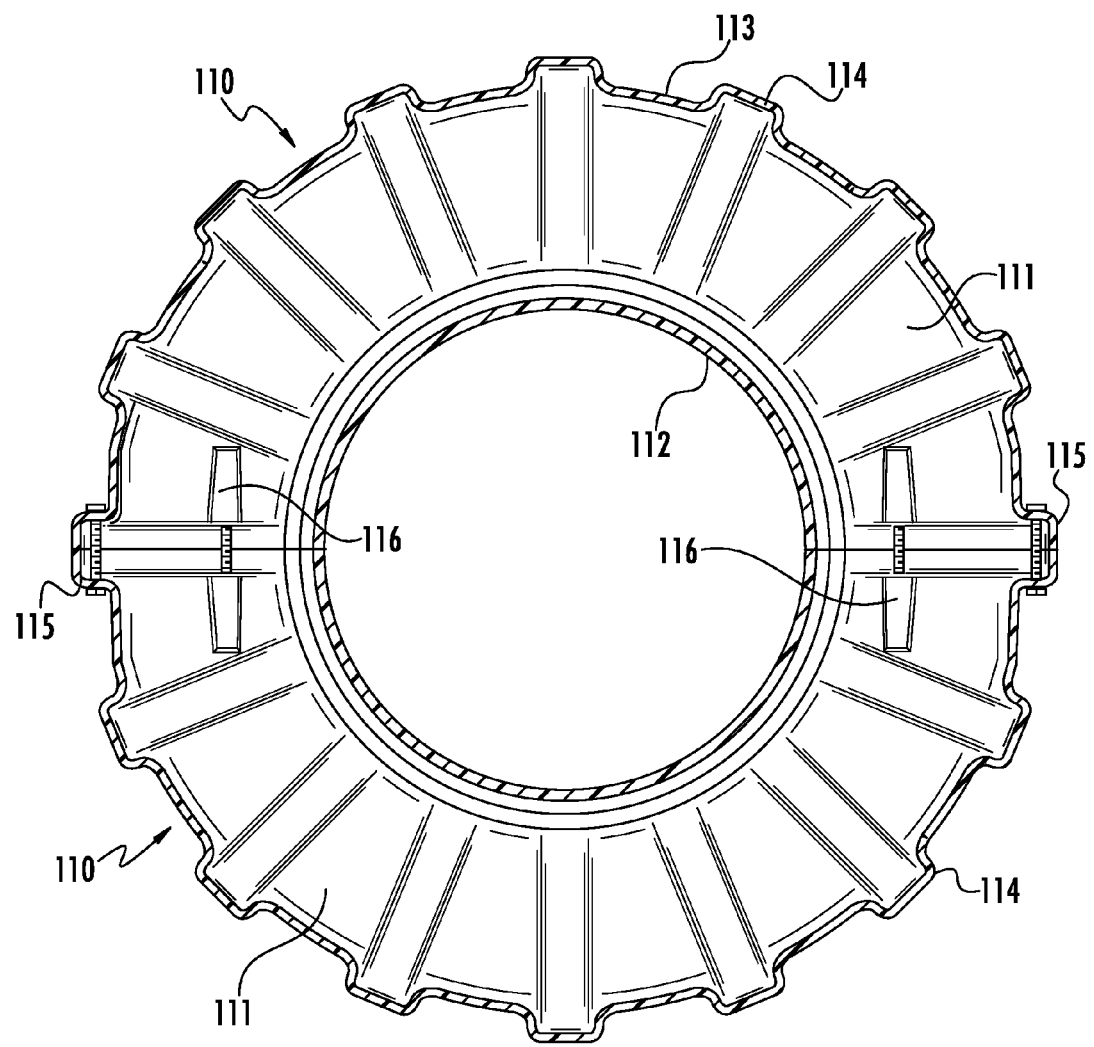
FIG. 3 is a side cross-sectional view of the tire of FIG. 1.

In various exemplary embodiments, as illustrated by the dashed lines in FIG. 3, the inside surface of the half-tire 110 substantially follows the shape of the outside surface. In various exemplary embodiments, the thickness of the tire material is substantially consistent at all points.

In various exemplary embodiments, the dimensions of the disclosed non-pneumatic tire may be varied in size to fit various irrigation systems and to operate effectively in different types of soils. Table 1 lists four different dimensions for twelve different exemplary embodiments (of half-tire 110).

TABLE 1

| Height (in.) | Outer Diameter (in.) | Inner Radius (in.) | Width (in.) |
|---|---|---|---|
| 21⅜ | 43 | 11 | 10¼ |
| 23¼ | 47½ | 11¼ | 12⅝ |
| 23¾ | 47½ | 11¼ | 12¾ |
| 26¾ | 53 | 18¼ | 12¼ |
| 20⅝ | 41½ | 9⅞ | 10⅜ |
| 20 | 40 | 8⅞ | 8⅞ |
| 21⅝ | 43 | 11⅛ | 10½ |
| 25⅞ | 51½ | 18¼ | 12⅜ |
| 21½ | 42 | 11¼ | 12¼ |
| 21 | 41½ | 11 | 10 |
| 21 | 41½ | 9⅞ | 9⅝ |
| 23 | 46 | 11¼ | 12⅛ |

Exemplary Tire Dimensions

In various exemplary embodiments, the wall thickness of the non-pneumatic tires is about 7/16 to ⅝ inches. In various exemplary embodiments, non-pneumatic the tires are sized and shaped for compatibility with various common size rims used on center pivot irrigation systems.

In various exemplary embodiments, the width of the tire relative of the size of the tire is engineered to provide a non-pneumatic tire with improved flexibility and strength. In various exemplary embodiments, the ratio of the outer diameter to the width varies from about 3.4 to about 4.5. In some preferred embodiments, the ratio is about 3.7 to about 4.3 and may be about 4.0 to about 4.2. In various exemplary embodiments, the ratio of the inner diameter to the width is about 1.7 to about 3.0. In some preferred embodiments, the ratio is about 1.9 to about 2.2 and may be about 2.0 to about 2.1. In various exemplary embodiments, the ratio of the tire diameter (e.g., the outer diameter minus the inner diameter) to the width is about 1.2 to about 2.5. In some preferred embodiments, the ratio is about 1.3 to about 2.3, about 1.6 to about 2.1, or about 1.9 to about 2.0.

Figure 4:
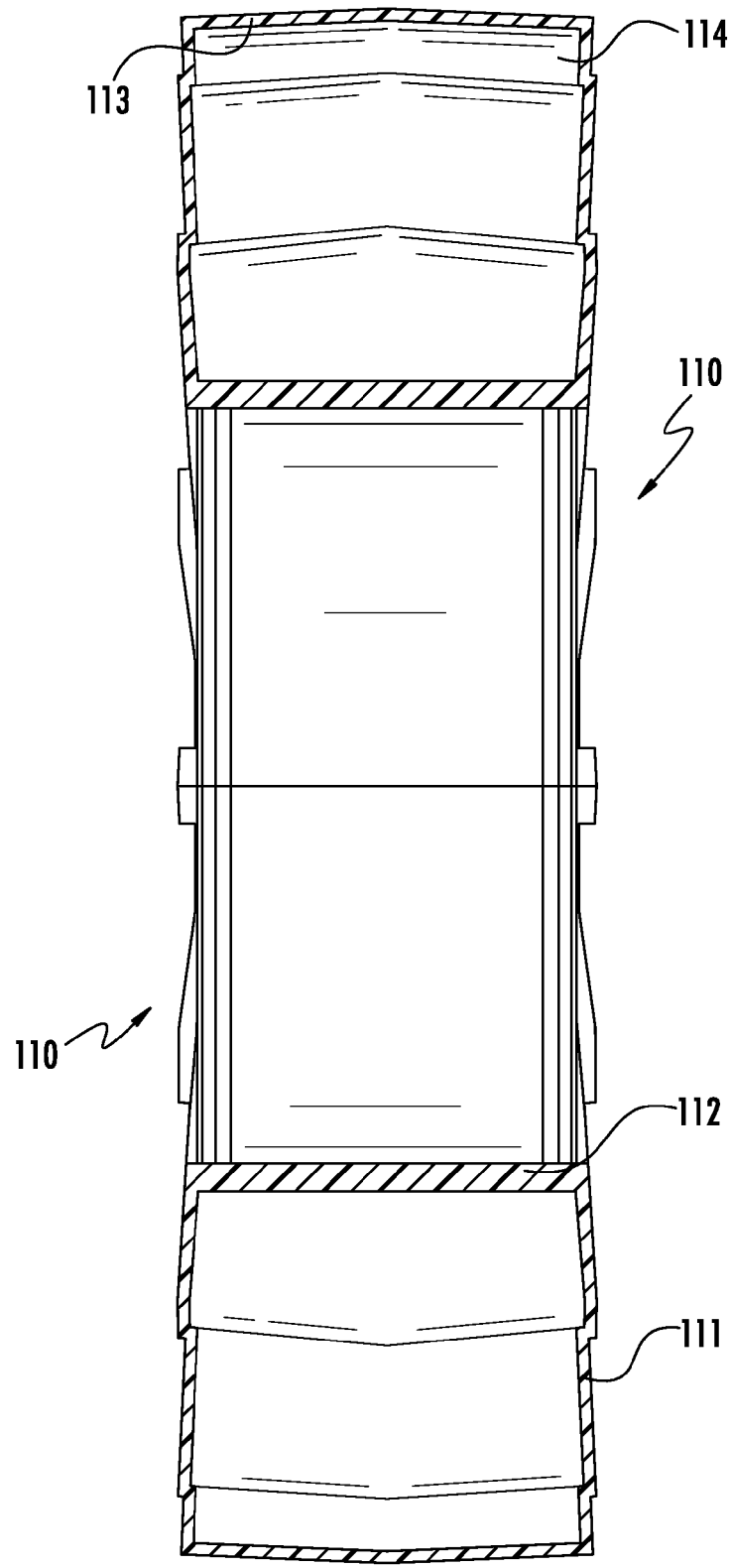
FIG. 4 is an end cross-sectional view of the tire of FIG. 1.
Figure 6:
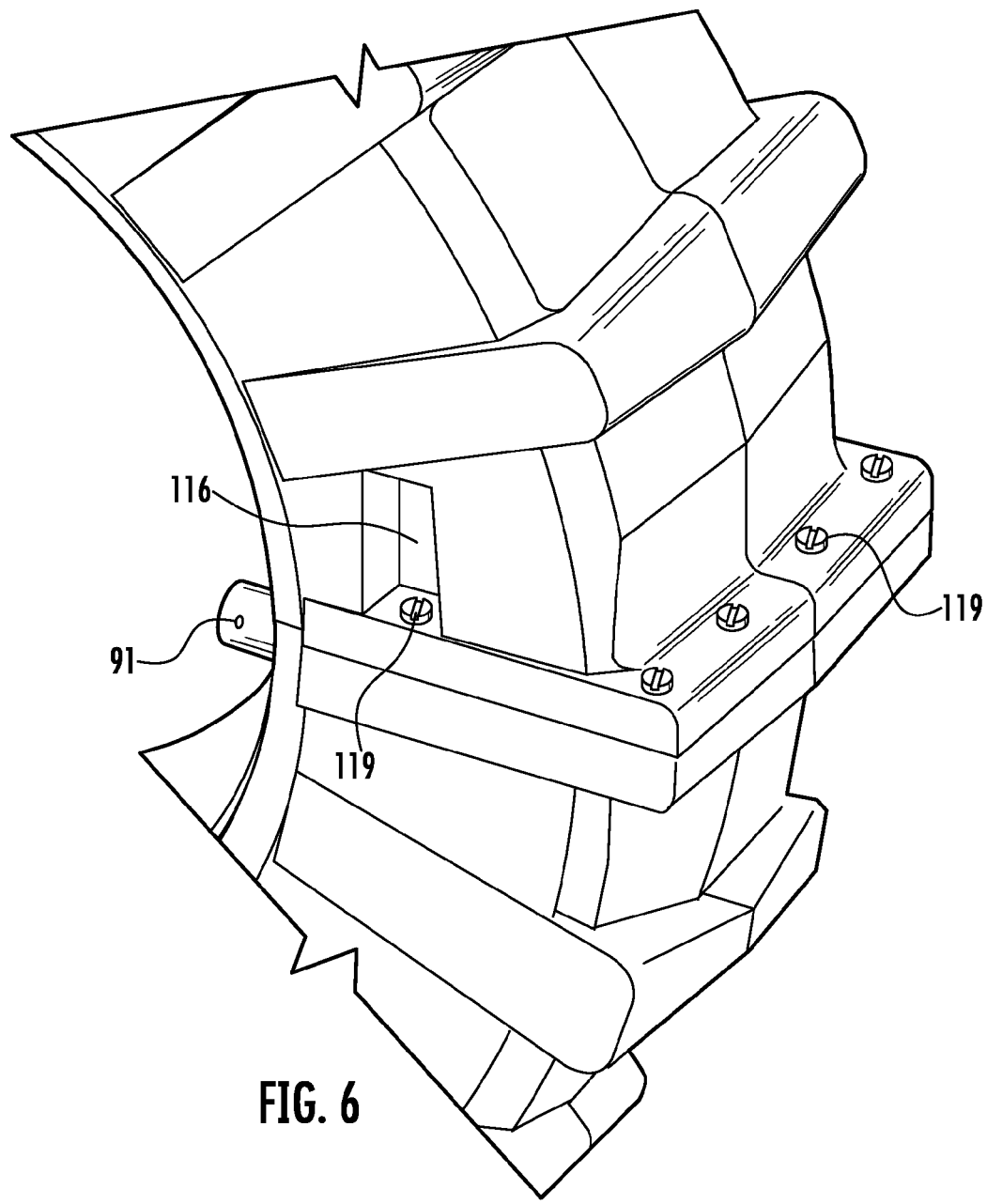
FIG. 6 is a partial perspective view of the tire of FIG. 1.

In various exemplary embodiments, as particularly shown in FIG. 6, the half-tire 110 includes side pockets 116 at both ends of both sidewalls 111 for coupling the half-tires 110. The bolting pockets 116 are molded solid with no interior gaps between mounting surfaces. In various exemplary embodiments, the side bolting areas 116 are recessed 1.5 inches deep and 3 inches long. As shown in FIGS. 3 and 4, the cavities 116 and half-cleats 115 contain openings 117 used to couple two half-tires 110 together. In various exemplary embodiments, the tire halves 110 are bolted together on a steel rim 90 at the edges with six ⅜ inch diameter zinc plated nuts 118 and bolts 119. The side pockets 116 redistribute holding power from the half-cleats 115 to the rim, which substantially reduces cracking and damage to the cleat 115. By indenting the side pocket 115, the tire 100 is given additional strength in the mounting area.

Figure 5:
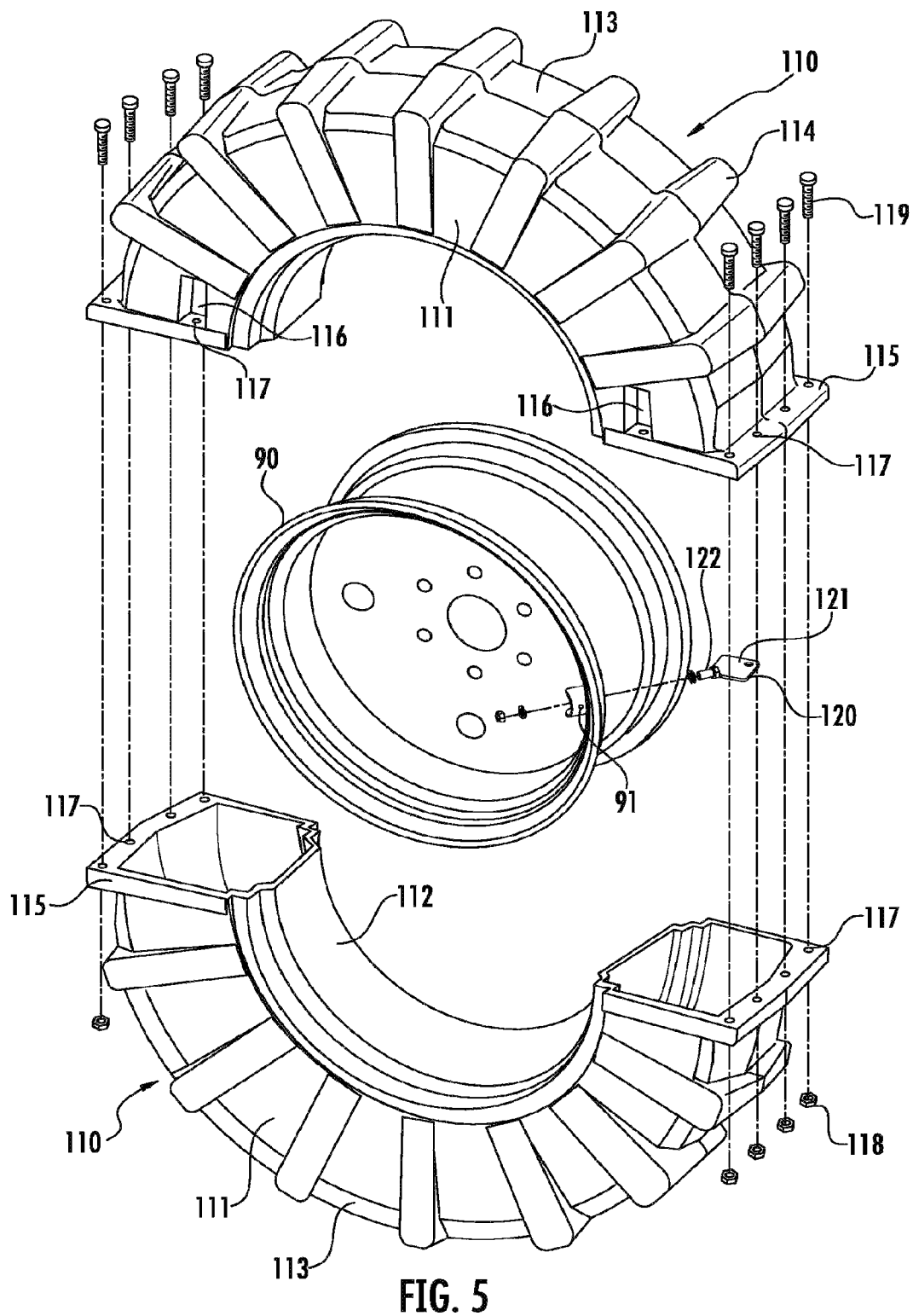
FIG. 5 is an exploded cross-sectional view of the tire of FIG. 1.

FIG. 5 shows two tire halves 110 aligned for coupling as a full tire 100. In various exemplary embodiments, the holes 117 are drilled with a ½ inch diameter. Although the embodiment shown in the figures has twelve bolt holes 117, the number of holes may be varied (e.g., embodiments less than eleven inches wide may have only three bolt holes in each half-cleat).

In various exemplary embodiments, as shown in FIG. 5, the tire 100 is mounted with a traction plate assembly 120. In various exemplary embodiments, the traction plate assembly 120 comprises a plate 121 and a post 122. In various exemplary embodiments, the post 122 is inserted into the air jack hole 91 in a conventional wheel or rim 90. In various exemplary embodiments, as shown in FIGS. 5-6, the plate 121 is placed between the half-tires 110. The traction plate assembly 120 prevents or reduces tire 100 slippage on the rim during changes in field level or flatness.

In various exemplary embodiments, the tires are made from polyethylene (PE) (e.g., 0.939 g/cc density 3.5 melt index Roto Grade PE) but may be made from any sufficiently strong and rigid material.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be appreciated that the construction and arrangement of the tire, as shown in the various exemplary embodiments, is illustrative only. While the tire, according to this invention, has been described in conjunction with the exemplary embodiments outlined above, various alternatives, modifications, variations, improvements, and/or substantial equivalents, whether known or that are or may be presently unforeseen, may become apparent. Accordingly, the exemplary embodiments of the tire, according to this invention, as set forth above, are intended to be illustrative, not limiting. Various changes may be made without departing from the spirit and scope of the invention. Therefore, the description provided above is intended to embrace all known or later-developed alternatives, modifications, variations, improvements, and/or substantial equivalents.

What is claimed is:

1. A non-pneumatic tire for a center pivot irrigation system comprising:
   a) two arcuate half-tire segments, the segments having two sidewalls connected by an outer circumferential wall and an inner circumferential wall;
   b) a plurality of transverse traction cleats circumferentially spaced on the outer circumferential wall extending between the sidewalls;
   c) a pair of connecting cleats at the ends of the half-tire segments having a plurality of apertures adapted for use in connecting the two arcuate half-tire segments; and
   d) a pair of side pockets for use in connecting the two half-tire segments, the side pockets:
      i) being recessed into the sidewalls between the outer circumferential wall and the inner circumferential wall; and
      ii) having side pocket openings for connectors that traverse the adjacent connecting cleats of the half-tire segments to hold the two half-tire segments together at points radially inward of the outer circumferential wall.

2. The non-pneumatic tire of claim 1 wherein the connecting cleats comprise a left half-cleat and a right half-cleat in lateral alignment.

3. The non-pneumatic tire of claim 1 wherein the ratio of the center width of the transverse traction cleats to the edge width of the transverse traction cleats is between about 1.25:1 and about 2.0:1.

4. The non-pneumatic tire of claim 3 wherein the ratio of the center width of the transverse traction cleats to the edge width of the transverse traction cleats is between about 1.33:1 and about 1.75:1.

5. The non-pneumatic tire of claim 4 wherein the ratio of the center width of the transverse traction cleats to the edge width of the transverse traction cleats is about 1.5:1.

6. The non-pneumatic tire of claim 1 wherein the transverse traction cleats:
   a) extend axially from a transverse traction cleat center to a transverse traction cleat edge; and
   b) have a width of about three inches at the transverse traction cleat center and a width of about two inches at the transverse traction cleat edge.

7. The non-pneumatic tire of claim 1 wherein the ratio of the half-tire outer diameter to the half-tire width is about 3.4 to about 4.5.

8. The non-pneumatic tire of claim 7 wherein the ratio of the half-tire outer diameter to the half-tire width is about 3.7 to about 4.3.

9. The non-pneumatic tire of claim 8 wherein the ratio of the half-tire outer diameter to the half-tire width is about 4.0 to about 4.2.

10. The non-pneumatic tire of claim 1 wherein the ratio of the half-tire inner diameter to the half-tire width is about 1.7 to about 3.0.

11. The non-pneumatic tire of claim 10 wherein the ratio of the half-tire inner diameter to the half-tire width is about 1.9 to about 2.2.

12. The non-pneumatic tire of claim 11 wherein the ratio of the half-tire inner diameter to the half-tire width is about 2.0 to about 2.1.

13. The non-pneumatic tire of claim 1 wherein the ratio of the half-tire diameter to the half-tire width is about 1.2 to about 2.5.

14. The non-pneumatic tire of claim 13 wherein the ratio of the half-tire diameter to the half-tire width is about 1.3 to about 2.3.

15. The non-pneumatic tire of claim 14 wherein the ratio of the half-tire diameter to the half-tire width is about 1.6 to about 2.1.

16. The non-pneumatic tire of claim 15 wherein the ratio of the half-tire diameter to the half-tire width is about 1.9 to about 2.0.

17. The non-pneumatic tire of claim 1 wherein the transverse traction cleats have rounded tips.

18. The non-pneumatic tire of claim 1 further including a plurality of connectors adapted for insertion into the apertures of the connecting cleats and into the side pocket openings.

19. The non-pneumatic tire of claim 1 wherein the transverse traction cleats are tapered such that a ratio of a center width of the transverse traction cleat to an edge width of the transverse traction cleat is at least about 1.25:1.

* * * * *